United States Patent [19]
Fagan

[11] 4,233,660
[45] Nov. 11, 1980

[54] VENDING MACHINE CONTROL SYSTEM

[75] Inventor: John C. Fagan, Oak Lawn, Ill.

[73] Assignee: Artag Plastics Corporation, Rosemont, Ill.

[21] Appl. No.: 950,683

[22] Filed: Oct. 12, 1978

[51] Int. Cl.³ ........................ G06F 15/46; G07F 5/22; G07F 11/00

[52] U.S. Cl. .................................. 364/104; 194/1 N; 364/107; 364/464; 364/479

[58] Field of Search ............... 364/104, 478, 479, 464, 364/465, 509, 510, 107; 194/1 N, 2, 3, 10, 13; 222/70, 26, 25, 52; 307/41, 141, 141.4

[56] References Cited

U.S. PATENT DOCUMENTS

| | | | |
|---|---|---|---|
| 3,894,220 | 7/1975 | Levasseur | 364/479 |
| 4,008,792 | 2/1977 | Levasseur et al. | 194/1 N |
| 4,034,839 | 7/1977 | Lee | 364/479 X |
| 4,084,237 | 4/1978 | Beachem et al. | 364/104 X |
| 4,107,777 | 8/1978 | Pearson et al. | 364/479 X |

FOREIGN PATENT DOCUMENTS

| | | | |
|---|---|---|---|
| 970468 | 7/1975 | Canada | 364/465 |

*Primary Examiner*—Joseph F. Ruggiero
*Attorney, Agent, or Firm*—Hill, Van Santen, Steadman, Chiara & Simpson

[57] ABSTRACT

A control system for effecting operation of a machine in accordance with a preselected program of instructions. The control system includes a microprocessor which is coupled to a programmable read only memory device to instruct the microprocessor for effecting various functions in accordance with a preselected memory. Externally originating data is coupled to the microprocessor through peripheral devices which communicate with the microprocessor in accordance with instructions from the memory device which are generated by the data received from the peripheral devices.

5 Claims, 10 Drawing Figures

VENDING MACHINE CONTROL SYSTEM

BACKGROUND OF THE INVENTION

This invention relates in general to a control system for a machine and, in particular, to a control system which utilizes a single chip eight-bit microprocessor to control the operation of the machine.

More specifically, but without restriction to the particular use which is shown and described, this invention relates to a solid state machine control system which is particularly adaptable for use with a vending machine whereby information is received and transmitted throughout the system to effect operation of the vending machine.

The machine control system disclosed herein utilizes solid-state circuitry to provide a more reliable control system whereby maintenance or replacement of parts can be easily accomplished. A single chip eight-bit microprocessor is used herein to effect a unique control whereby information is received into the system by external means, such as, a customer depositing coins into a vending machine. The information is then transmitted to the microprocessor which will effect operation of the machine in accordance with a preselected or predetermined program which is stored in a programmable read only memory (PROM) which is within the control system of the machine. The program contained within the PROM comprises a set of instructions that dictate the manner in which the system will operate depending on various signals received into the system, such as, coins being deposited into the machine, actuation of a coin return switch or depression of a key switch corresponding to a product desired to be dispensed from the machine.

The control system when used with a vending machine has the capacity to handle 42 different products. A 42 switch keyboard, with each switch corresponding to a different product contained within the machine, is coupled in a six by seven matrix. The control system has a plurality of price switches which permits the price of each product to be pre-set for any amount between $0.05 and $7.95, in increments of $0.05. The various key switches of the keyboard are operatively coupled to one of the price switches which corresponds to the price of the product which is to be dispensed upon actuation of the corresponding key switch. The control system also operatively couples a display or a readout panel which will visually display, to the customer, the amount of money he has deposited into the vending machine.

A price comparator, operatively coupled between the price selection switches and the readout panel, compares the amount of money present in the machine with the actual price of the product selected. In the event that the prices are not in agreement, the control system ignores the price selection switch output and waits for another signal, such as, additional coins being deposited, actuation of a coin return switch or actuation of another keyboard switch which corresponds to a different product coinciding with the amount of money deposited in the machine. When coincidence between the readout display and price selection switches is reached, the control system will begin a vend cycle to dispense the product selected.

To insure that the customer receives his product, the control system will wait for a dispense verification signal before collecting the coins deposited into a cash box. The dispense verification signal is transmitted when the product desired hits the dispensing tray. In the event that the particular product selected is sold out or for any other reason cannot or does not discharge from the machine, the dispense verification signal will not be received. If a dispense verification signal is not received, the coins deposited in the machine will be returned to the customer. The machine will in either situation be reset for a new cycle of operation.

SUMMARY OF THE INVENTION

It is, therefore, an object of this invention to improve control systems for effecting machine operation.

Another object of this invention is to control machine operation through predetermined operational instructions.

A further object of this invention is to vary the operation of the machine being controlled in response to informational data being communicated to the system.

Still another object of this invention is to couple an externally generated termination signal to the control system for completing operational instructions to the machine and establishing another cycle of operation.

These and other objects are attained in accordance with the present invention wherein there is provided a control system for effecting operation of a machine in accordance with a preselected program of instructions. The control system includes a microprocessor which is coupled to a programmable read only memory device to instruct the microprocessor for effecting various functions in accordance with a preselected memory. Externally originating data is coupled to the microprocessor through peripheral devices which communicate with the microprocessor in accordance with instructions from the memory device which are generated by the data received from the peripheral devices.

DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein.

DESCRIPTION OF THE PREFERRED EMBODIMENT

Figure 1A:
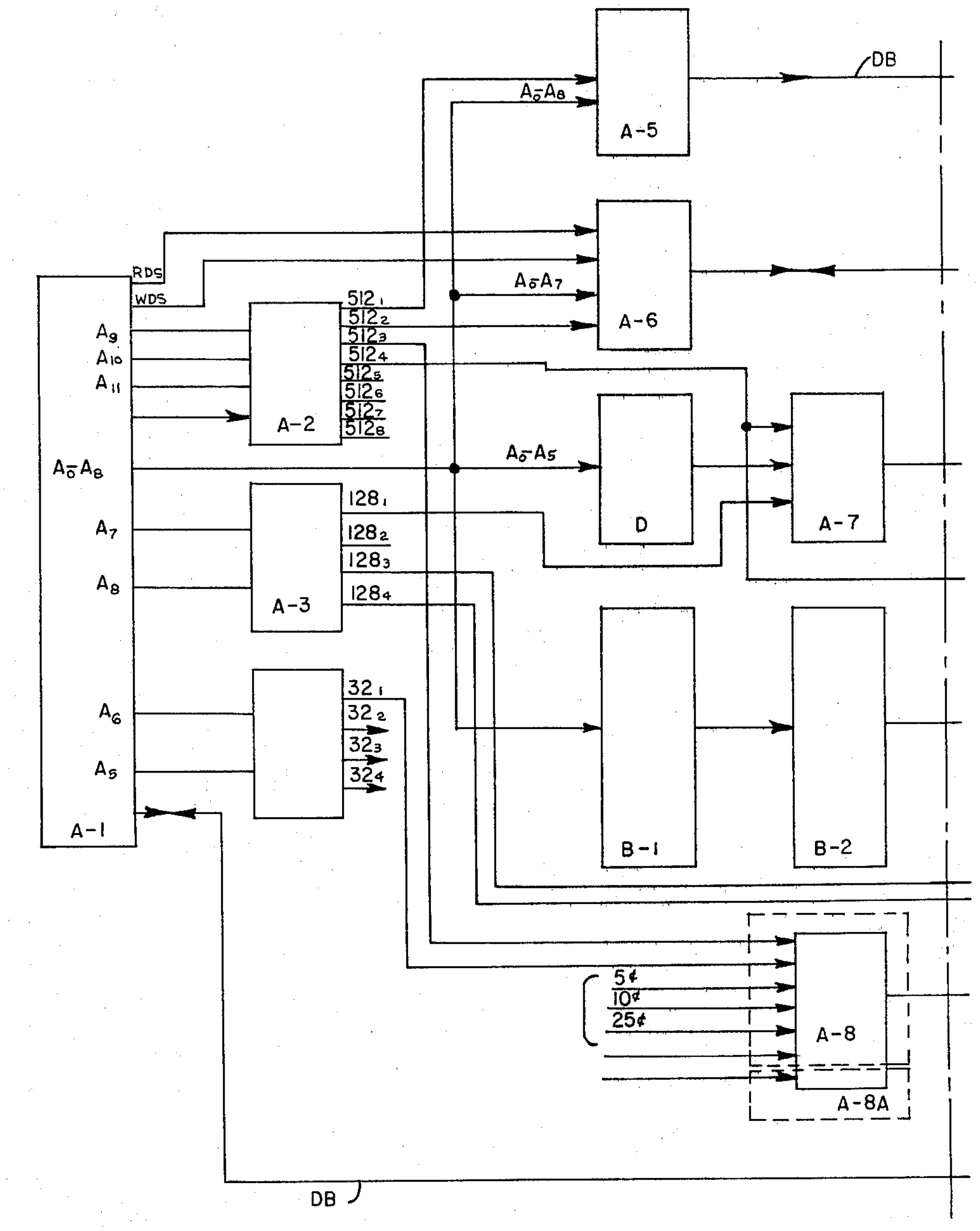
FIGS. 1*a* and 1*b* are a logic block diagram of a machine control system.
Figure 1B:
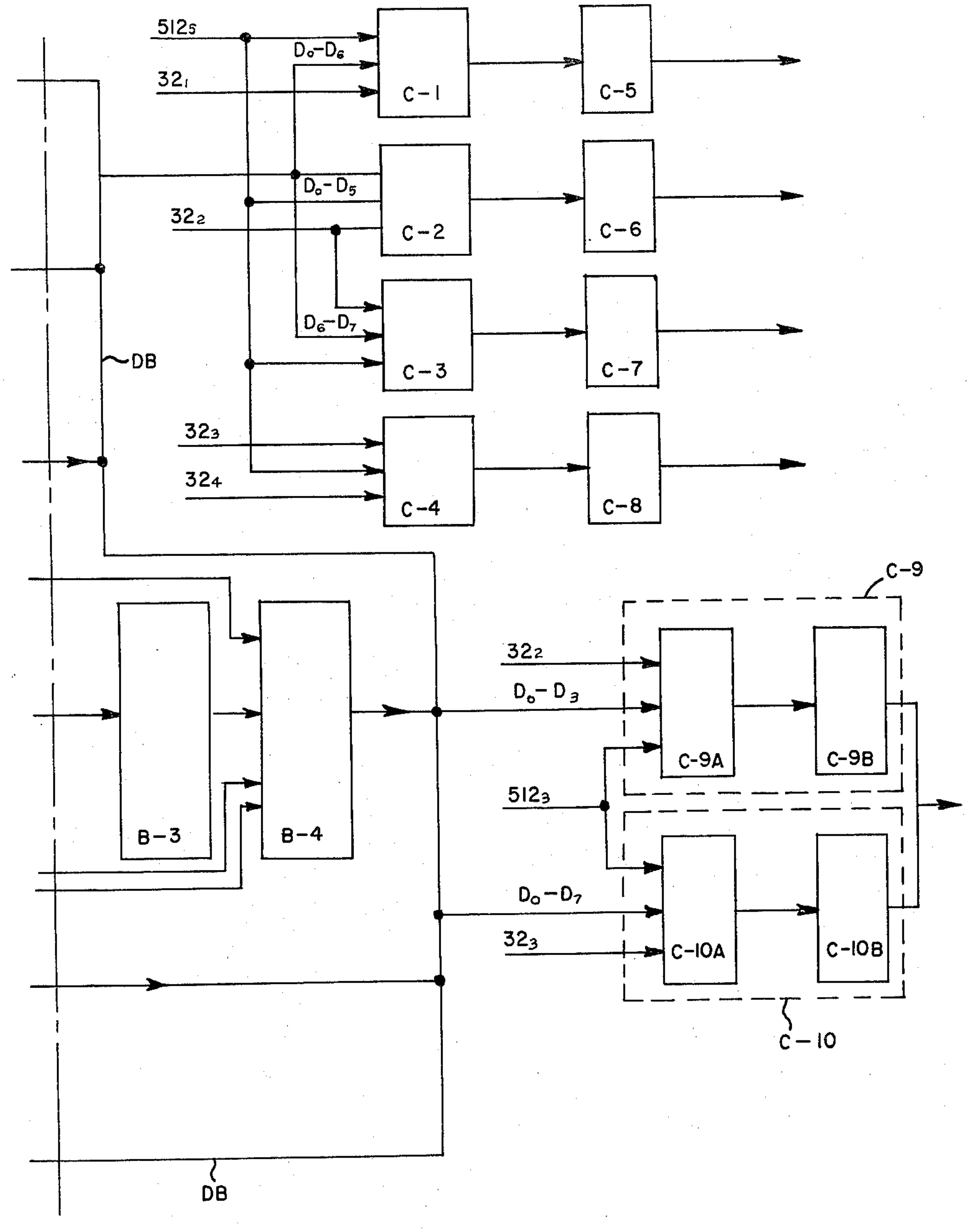

Referring now to FIGS. 1*a* and 1*b*, there is shown a logic block diagram of a vending machine control system. The vending machine control system utilizes a single chip eight-bit microprocessor A-1 of the type manufactured by National Semiconductor, Inc. and sold under Model No. ISP-8A/500D. The microprocessor A-1 includes an address buss containing sixteen address signal lines designated $A_0$ through $A_{15}$. However, in the particular embodiment disclosed only address lines $A_0$ through $A_{11}$ are utilized. The status of the information on the address lines $A_0$ through $A_{15}$ is outputed on a program counter portion PC of the microprocessor A-1.

The microprocessor A-1 also contains an eight-bit parallel, bi-directional data buss DB and has access to sixteen groups of 4096 bytes of memory. While the microprocessor A-1 is capable of accessing sixteen groups, for purposes of the preferred embodiment only one group of 4096 bytes is utilized. This group of bytes if subdivided into eight groups of 512 bytes by means of a decoder A-2. The microprocessor A-1 and decoder A-2 are coupled by address lines $A_9$, $A_{10}$ and $A_{11}$ (as shown in FIG. 1 and in more detail in FIG. 2) wherein address lines $A_9$, $A_{10}$ and $A_{11}$ are coupled between output terminals 34, 35 and 36, respectively, of the microprocessor A-1 and the input terminals 1, 2 and 3, respectively of the three line to eight line decoder A-2. As shown in all of the figures, the 7400 series integrated circuit family, which is known to those skilled in the art, is utilized throughout the system and is readily available commercially from numerous semiconductor manufacturers. The eight groups of 512 bytes subdivided by the decoder A-2, are further subdivided through address lines $A_7$ and $A_8$ connected between output terminals 32 and 33, respectively, of the microprocessor A-1 and input terminals 9 and 5, respectively, of a hex inverter H-1. The output of the hex inverter H-1 for address line $A_8$ is coupled from output terminal 6, through a quad nand buffer Q-3, to input terminal 3 of one portion of a dual two-line to four-line decoder A-3. The output from address line $A_7$ is coupled from output terminal 8 of the hex inverter H-1, through another quad nand buffer Q-1, to the input terminal 2 of the decoder A-3.

The output of the decoder A-3 then subdivides the eight groups of 512 bytes into four groups of 128 bytes each. The four groups of 128 bytes are further subdivided through address lines $A_5$ and $A_6$ coupled to the output terminals 30 and 31, respectively, of the microprocessor A-1. The address line $A_5$ is coupled to a hex inverter H-2 and through the buffer Q-1 to provide an input to the second portion of the dual two-line to four-line decoder A-4. The address line $A_6$ is coupled to the hex inverter H-1 and through buffer A-1 as another input to the second portion A-4 of the decoder in a similar manner as previously discussed in regard to the other address lines.

The four groups of 128 bytes are thereby further subdivided into four groups of 32 bytes. The signals from the output terminals of the three decoders A-2, A-3 and A-4 are combined to form unique address signals and function to select various peripheral gates in the system for effecting operations in a manner to be hereinafter described in detail.

System peripherals, as described hereinafter, include a programmable read only memory (PROM), a random access memory (RAM), a keyboard and its associated circuitry through which product selection is made, the coin mechanism inputs and associated circuitry to dispense a product and to verify product dispensing, a readout or display system and its associated circuitry, product selection or dispensing solenoids and their associated circuitry, and a product pricing board and associated circuitry through which product pricing is effected.

Communication between the microprocessor A-1 and the system peripherals is effected by means of data lines $D_0$ through $D_7$ which are coupled to terminals 16-9, respectively, thereby providing a bi-directional eight-bit parallel data buss DB. The data lines $D_0$–$D_7$ are best shown in FIGS. **2–4*a* and 4*b* and are coupled to the microprocessor A-1**, and illustrate the manner in which data is coupled to and from the microprocessor.

Referring now to FIGS. **3*a* and 3*b* the data lines $D_0$–$D_7$ are coupled to input terminals of one portion 0B-1 of an octal two-way buffer to input data to the system peripherals. The output terminals of the octal two-way buffer from the system peripherals is through a second portion OB-2 to provide the bi-directional data transmission between the microprocessor A-1** and the system peripherals.

Referring again to FIG. 2, to initiate operation of the microprocessor A-1, the microprocessor is connected to a suitable power source which is passed through a power-filter circuit PF to guard the microprocessor A-1 from the effects of electronic noise. Upon energization of the power supply, a power-on reset circuit PR resets the microprocessor A-1 to a predetermined initial starting state. The reset signal from the power-on reset circuit PR is coupled to the input terminal 7 of the microprocessor A-1 to reset the address counter of the microprocessor to an initial starting state, preferably of zero, from which the sequence of operations will begin. An RC clock circuit RC is coupled to input terminals 37 and 38 of the microprocessor A-1 to form a clock circuit for sequencing operation of the microprocessor.

Operation of the microprocessor A-1 is controlled through the programmable read only memory (PROM) A-5 which is coupled to the microprocessor A-1 through the data buss DB as shown in FIGS. **3*a* and 3*b*. The PROM A-5 is coupled to the microprocessor A-1 through address lines $A_0$–$A_8$, by means of the hex inverter and quad nand buffer system previously described and shown with reference to FIG. 2. The PROM A-5 is also coupled to the microprocessor A-1, through the decoder A-2, by coupling the output terminals 15 of the decoder A-2 to the input terminal 15 of the PROM A-5. The coupling of the first group of 512 data bytes from the decoder A-2 to the PROM A-5 enables data to be transmitted between the PROM A-5 and the microprocessor A-1 along buffered address lines $BA_0$–$BA_7$ which have previously been decoded through the hex inverter and quad nand buffer system previously described. These same buffered address lines $BA_0$–$BA_7$ are also coupled to both portions of the random access memory (RAM) A-6 to provide informational data into the RAM A-6 in accordance with an enabling signal, which signal corresponds to the second group of 512 data bytes, received on input terminal 15** of both portions of the RAM.

The memory in the PROM A-5 is preselected or predetermined to effect functioning of the microprocessor A-1 in the manner in which the system is to be operated. The PROM A-5 controls the sequence of operation of the microprocessor A-1 in accordance with the predetermined program stored in the PROM A-5. The program for the PROM A-5 is shown in the attached Table 1. While the PROM A-5 disclosed in FIGS. **3*a* and 3*b*** is preferably a 74S472N permanent memory PROM, other types of programmable read only memory devices could be utilized.

Upon initiation of operation, when power is applied, the microprocessor A-1 is reset to an initial starting point through the PR circuit previously described. The microprocessor A-1 will then begin to initiate a series of operations as instructed by the program in the PROM A-5, and continue to operate in accordance with these instructions until receiving a feedback signal from one of the system peripherals through the data buss DB. The particular sequence of operation of the microprocessor A-1 is dependent upon the feedback signals which are received by the microprocessor from the various system peripherals with which the microprocessor A-1 is communicating under direction of the program in the PROM A-5.

Figure 3A:
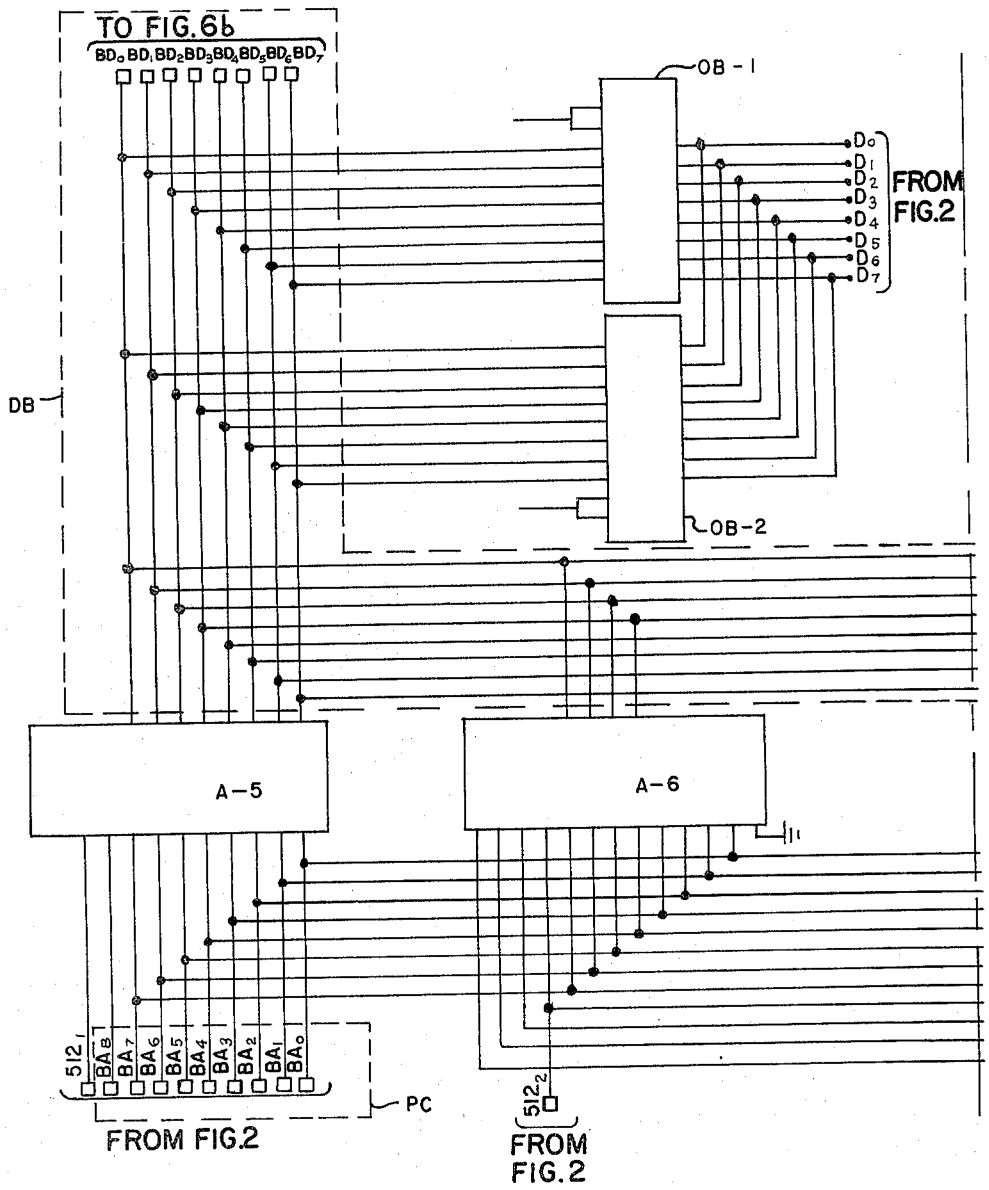
FIGS. 3*a* and 3*b* are another portion of the electrical schematic of the microprocessor and its associated circuitry, including a portion of the system peripherals.
Figure 3B:
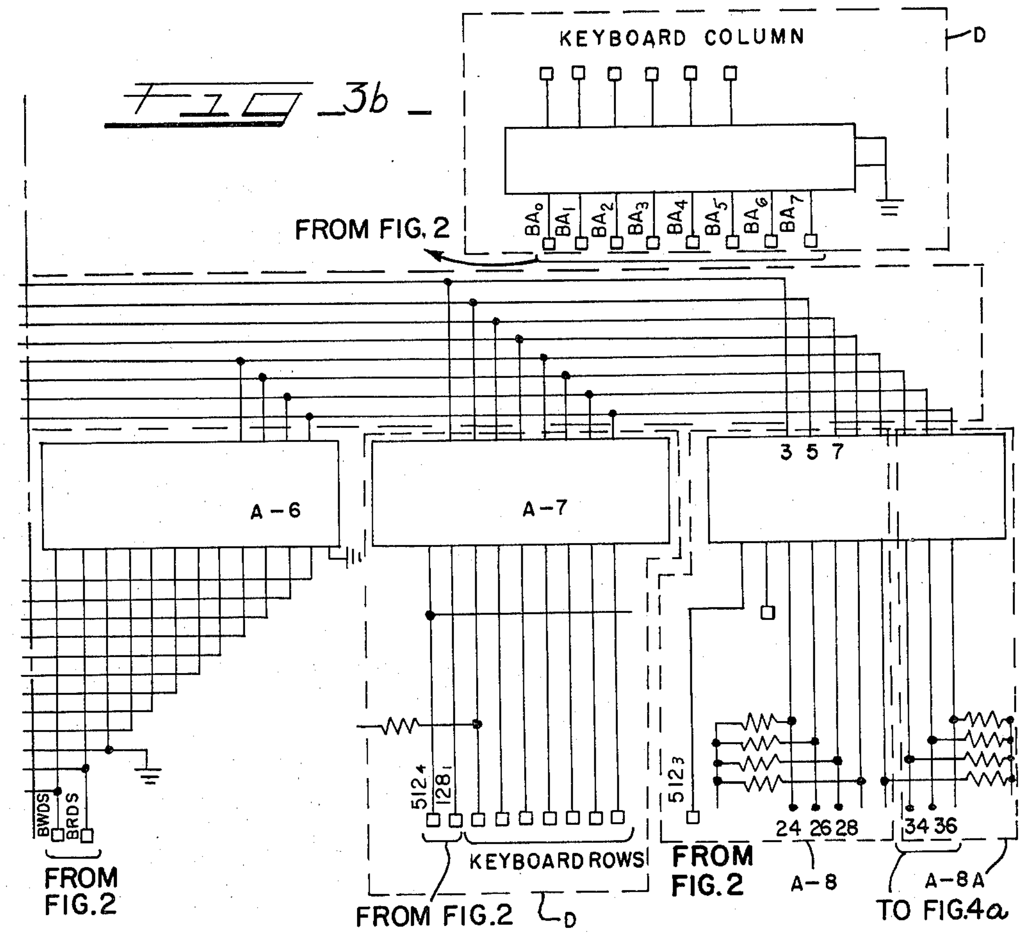

The microprocessor A-1 is first directed by the PROM A-5 to continuously interrogate a coin mechanism buffer A-8 of the coin mechanism peripheral to determine if a coin has been placed into the vending machine. The apparatus through which coins are placed into the system is not disclosed herein, but comprises any commercially available device which differentiates as to the denomination and integrity of the coin input into the vending machine to provide a signal on input terminals representative of the coin value. As shown in FIGS. 3*a* and 3*b*, input terminals 24, 26 and 28 (which correspond to a nickel, dime and a quarter, respectively) are provided to determine that a coin has been receive into the coin mechanism. A signal being present on any of the input terminals 24, 26 or 28 will cause a buffered output signal on the corresponding output terminals 3, 5 or 7 of the coin mechanism buffer A-8. The buffered output signal is transmitted on the data buss DB through the output portion OB-2 of the octal two-way buffer, through data lines $D_0$, $D_1$ and/or $D_2$ corresponding to the nickel, dime and quarter inputs, respectively, to the microprocessor A-1. Any signals which may appear on any of the other data lines at this time are masked.

Figure 4A:
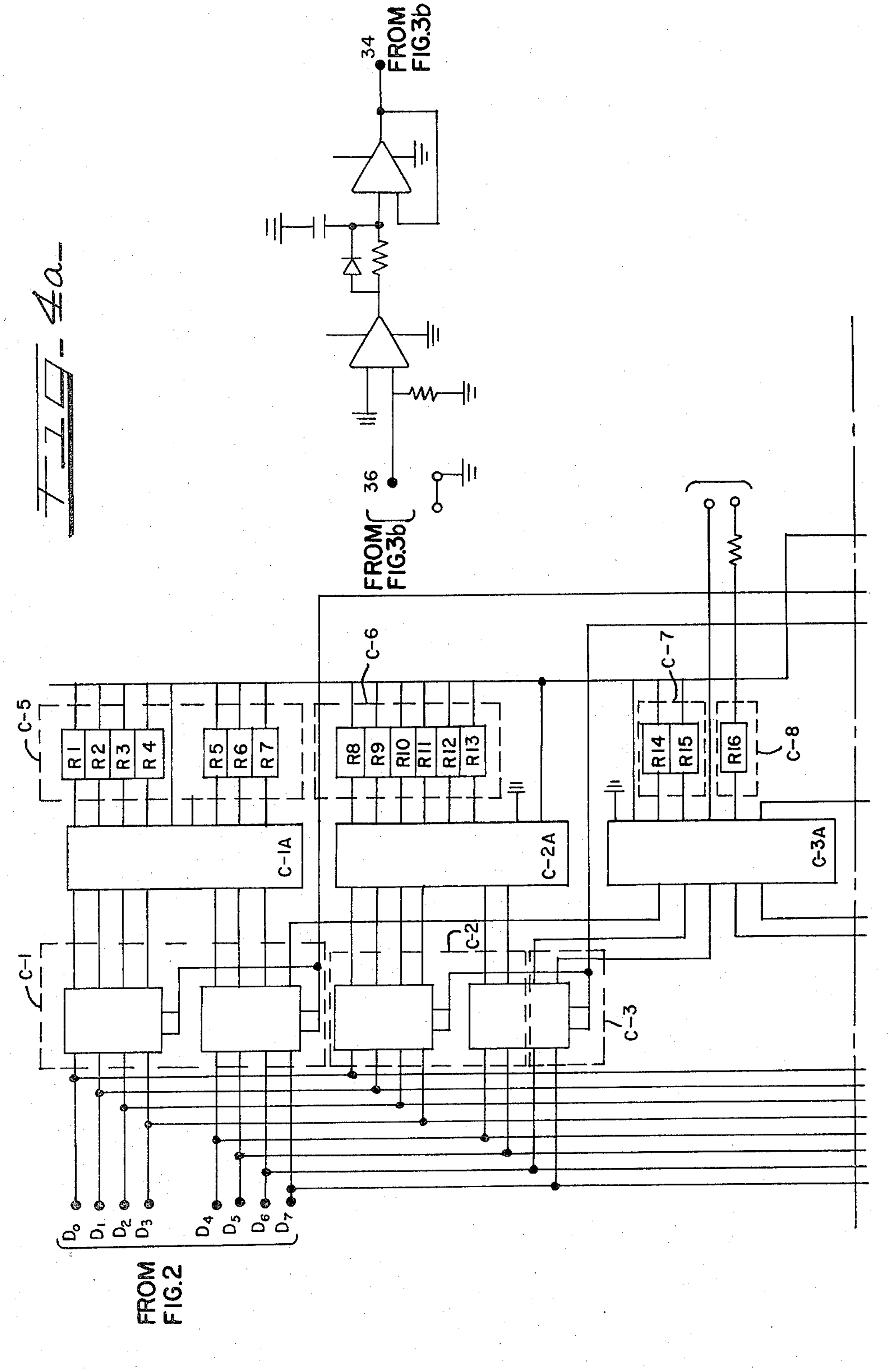
FIGS. 4*a* and 4*b* are an electrical schematic of other system peripherals utilized to display the amount of money in the machine, to dispense the product desired, and to either accept or return the money deposited.
Figure 4B:
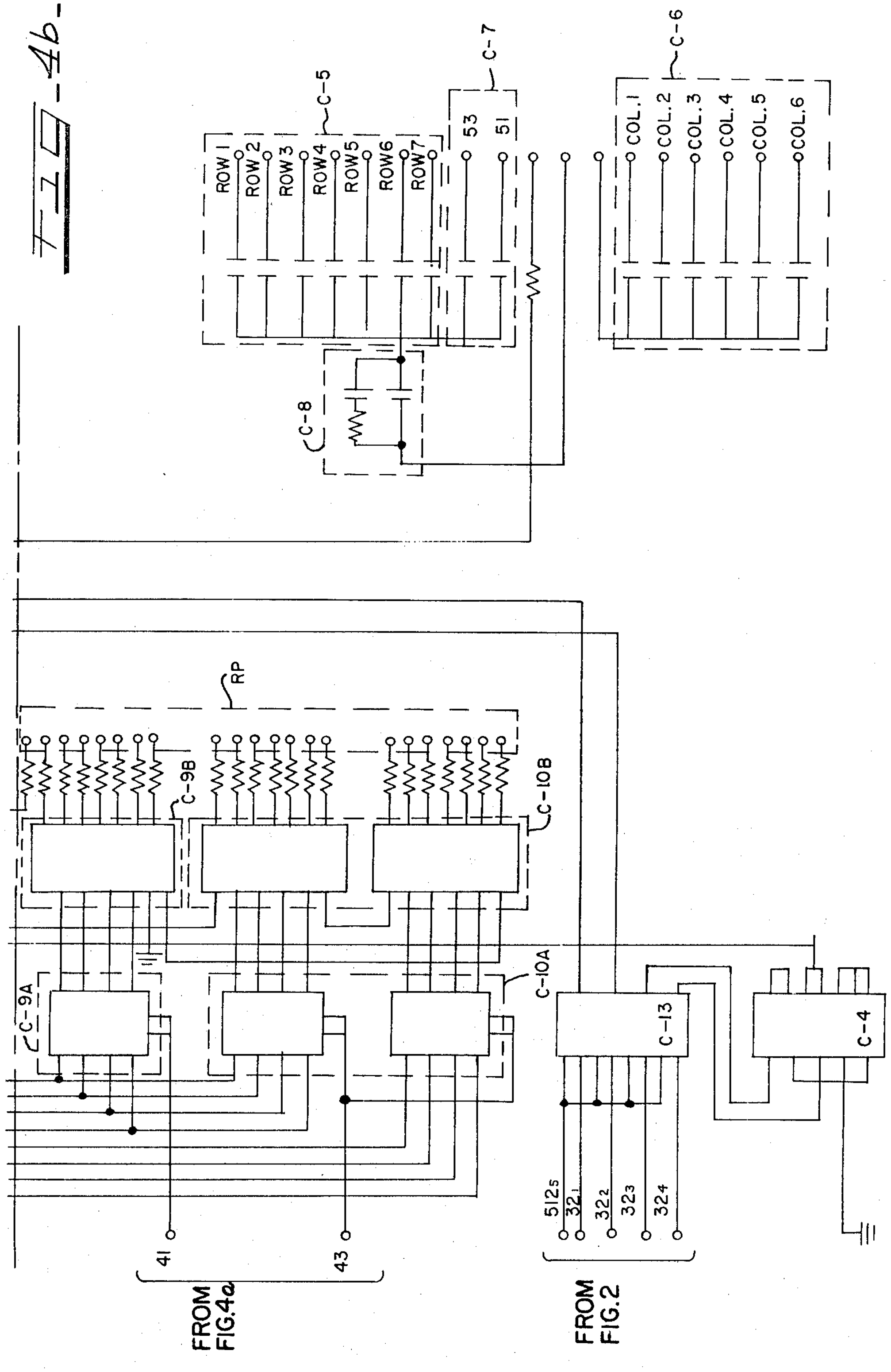

Upon data being coupled to the microprocessor A-1 on data lines $D_0$, $D_1$ or $D_2$, the microprocessor A-1 will be instructed by the PROM A-5 to initiate a different cycle of operation. The microprocessor A-1 will cause a signal to be stored in the RAM A-6 which corresponds to the value of the coin which has been received, and then actuate a read out peripheral C-9 and C-10 to provide a visual display of the accumulated coin value which has been received as stored in the RAM A-6 (FIGS. 4*a* and 4*b* ) on a LED readout panel RP.

Subsequent to the first coin being deposited in the coin mechanism peripheral, the microprocessor A-1 is directed by the memory of the PROM A-5 to again address the coin mechanism peripheral. Simultaneously the microprocessor A-1 is addressing the keyboard peripheral D, shown in FIGS. 1*a* and 1*b*, and in two portions in FIGS. 3*a* and 3*b*. If additional coins are deposited, the signal present on the data lines $D_0$–$D_2$ will cause the microprocessor A-1 to respond in the manner previously described, and a signal corresponding to the value of the coins deposited will be loaded into the RAM A-6 which will store a signal corresponding to the total value of the coins accumulated through the coin mechanism peripheral. The accumulated value stored in the RAM A-6 will then be loaded by the microprocessor A-1 into the coin readout peripheral to update the amount displayed on the readout panel RP.

As previously described, when the first coin has been deposited through the coin mechanism peripheral, and the corresponding signal stored in the RAM A-6, the PROM A-5 then instructs the microprocessor A-1 to load a signal, corresponding to the value of the signal loaded into the RAM A-6, into the coin readout display peripheral which will appear on the LED readout panel RP.

The coin readout display peripheral, shown in FIGS. 1*a* and 1*b* and FIGS. 4*a* and 4*b*, comprises the three digit LED display or readout panel RP which is coupled into the system in the manner shown in these figures and registers C-9 and C-10. The register C-9 is a one digit register for displaying the dollar amount deposited into the coin mechanism, which includes a storage register C-9A and a seven-segment decoder C-9B which converts the binary signals from the storage register C-9A to the segment display. The coin readout peripheral also includes the two digit register C-10 to indicate the cents display, which similarly comprises two storage registers C-10A and two seven-segment decoders C-10B to convert the binary signals from the storage registers C-10A to the segment display. The two register systems C-9 and C-10 are both coupled to the data buss DB so that the signals present on the data buss, through actuation of the coin mechanism peripheral, will be displayed on the three digit readout panel RP.

The data present on the data buss DB is loaded to the readout peripheral for display on the readout panel RP by coupling the third group of 512 data bytes from the decoder A-2 to each of the registers C-9 and C-10. The second group of 32 data bytes, from decoder A-4, is coupled to the register C-9 and the third group of 32 data bytes, from decoder A-4, is coupled to the register C-10. In this manner the dollar amount is displayed on the readout panel RP by an AND coupling of the third group of 512 data bytes with the second group of 32 data bytes, to allow the signal on the data buss DB to be loaded into the register C-9. The cents portion to be displayed on the readout panel RP is loaded into the registers C-10 by an AND coupling of the third group of 521 data bytes with the third group of 32 data bytes to permit the data on the data buss DB to be loaded into the registers C-10. As additional coins are deposited into the coin mechanism peripheral, effecting output signals on the data buss DB, the same sequence or cycle of operation is again completed to load this information into the RAM A-6 and to display the accumulated value of these coins on the readout panel RP in the manner previously described.

In the event that at any time after a coin has initially been deposited through the coin mechanism peripheral a coin return switch CR (which comprises a portion of the coin mechanism peripheral) is actuated, a signal on input terminal 32 will be coupled through the coin mechanism peripheral buffer A-8 to couple the coin return signal through the data buss DB to the microprocessor A-1 on data line $D_4$. The program from the PROM A-5 causes the microprocessor A-1, upon receipt of the coin return signal on data line $D_4$, to energize a coin return solenoid (not shown) through relay R-15 by providing a signal on output terminal 51. Relay R-15 is energized by a signal on data line $D_6$ through a register C-3 by an AND coupling of the fifth group of 512 data bytes with the second group of 32 data bytes. The AND coupling of the fifth group of 512 data bytes and the second group of 32 data bytes is effected through suitable AND gates C-13. When the coin return has been effected, the microprocessor A-1 is instructed by the PROM A-5 to reset the RAM A-6 and return the LED display in the readout panel RP to zero.

After a customer has deposited the number of coins corresponding to the pricing of the desired product, the product is selected by actuation of a key switch of a standard push-button keyboard D, the structure of which is not shown. While the keyboard structure does not form a portion of the invention, a preferred embodiment has been constructed utilizing a 42 position keyboard such as Model No. 82 manufactured by Grayhill, Inc., connected in a six by seven matrix configuration. The six by seven matrix format has been selected to minimize the number of wires required to be connected between the keyboard and the vending machine.

Figure 5:
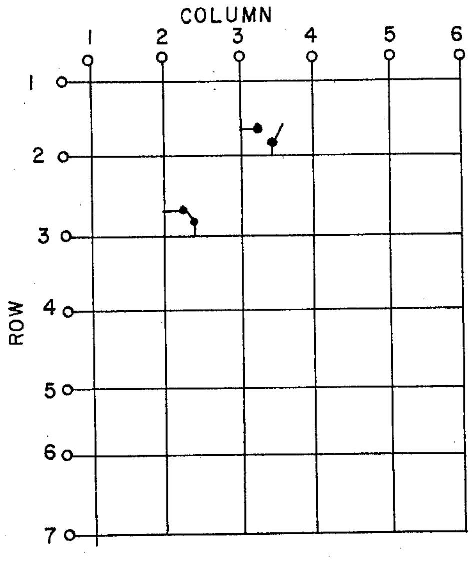
FIG. 5 is a mechanical schematic of the keyboard matrix utilized to select one of 42 products.

As best shown in FIG. 5, the six by seven matrix has been arranged to correspond to six columns and seven rows to define coordinates corresponding to the 42 product capacity of the keyboard D. When the customer has chosen the product to be dispensed, by depressing a push-button switch on the keyboard D corresponding to the product selected, the microprocessor A-1 will sequentially step through the matrix as depicted in FIG. 5 to determine which key switch has been depressed. The sequential interrogation of the keyboard matrix is effected by sequentially energizing columns 1 through 6, and interrogating each of the rows 1 through 7, until a switch closure has been detected. When a switch closure on the matrix has been detected, a number from the matrix, which corresponds to the keyboard switch which has been selected, will be stored or loaded into the RAM A-6 by operation of the microprocessor A-1 in accordance with the program stored in the PROM A-5.

Figure 2:
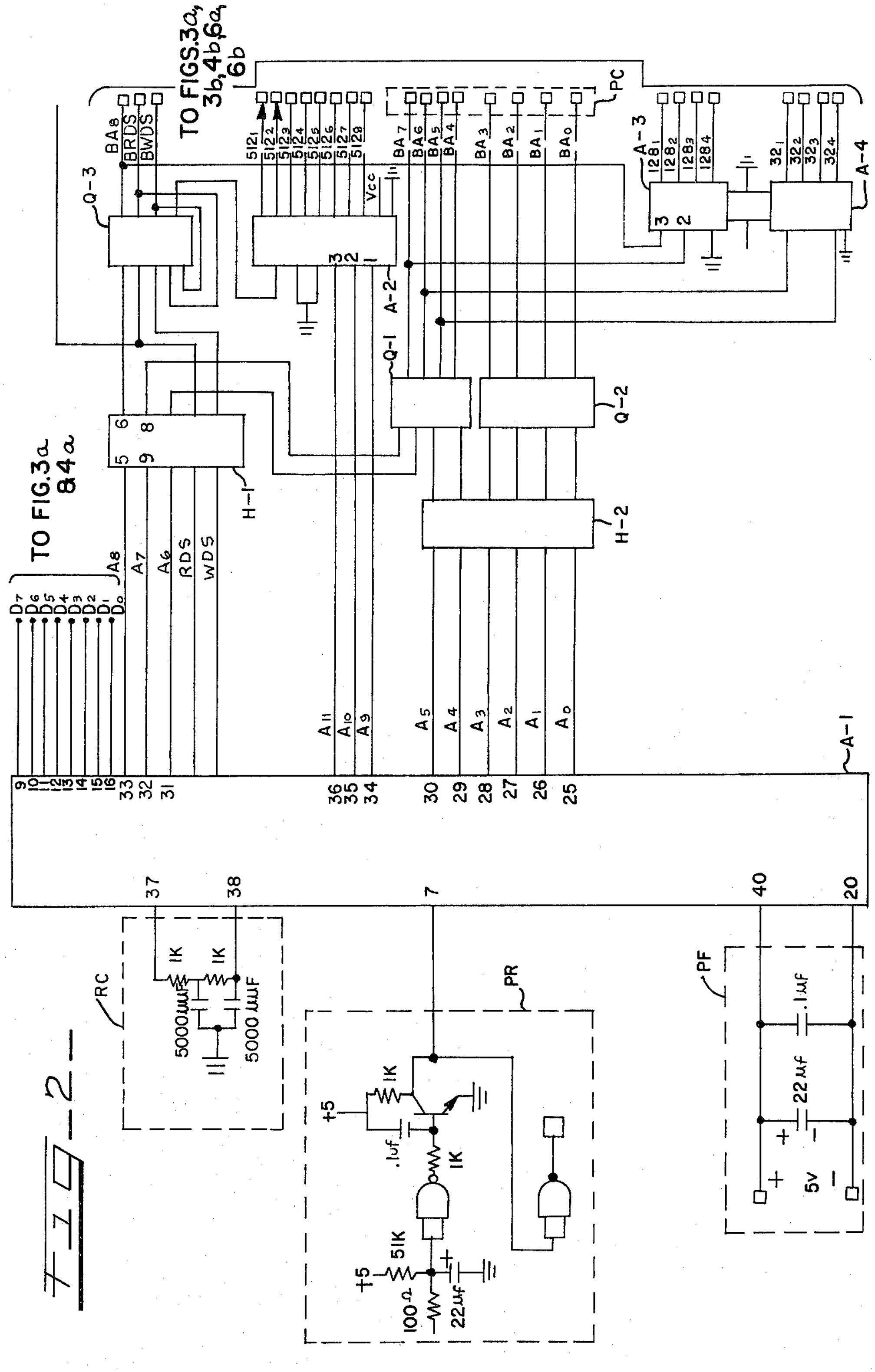
FIG. 2 is a portion of an electrical schematic of a microprocessor and its associated circuitry which is used in accordance with the present invention.

When a key switch has been depressed, a signal will be provided through the keyboard peripheral buffer A-7 which corresponds to the column and row selected. This data will be placed onto the data buss DB and coupled to the microprocessor A-1 through the data lines $D_0$–$D_7$, depending upon the row and column which has been selected. The microprocessor A-1, upon receipt of this data, will in accordance with the program of the PROM A-5 load this information into the RAM A-6. When the key switch is released, the microprocessor A-1, in accordance with the program of the PROM A-5, is instructed to load the number corresponding to the product selected from the RAM A-6 into a program counter PC as shown in FIGS. 2 and 6*a* and 6*b*.

Figure 6A:
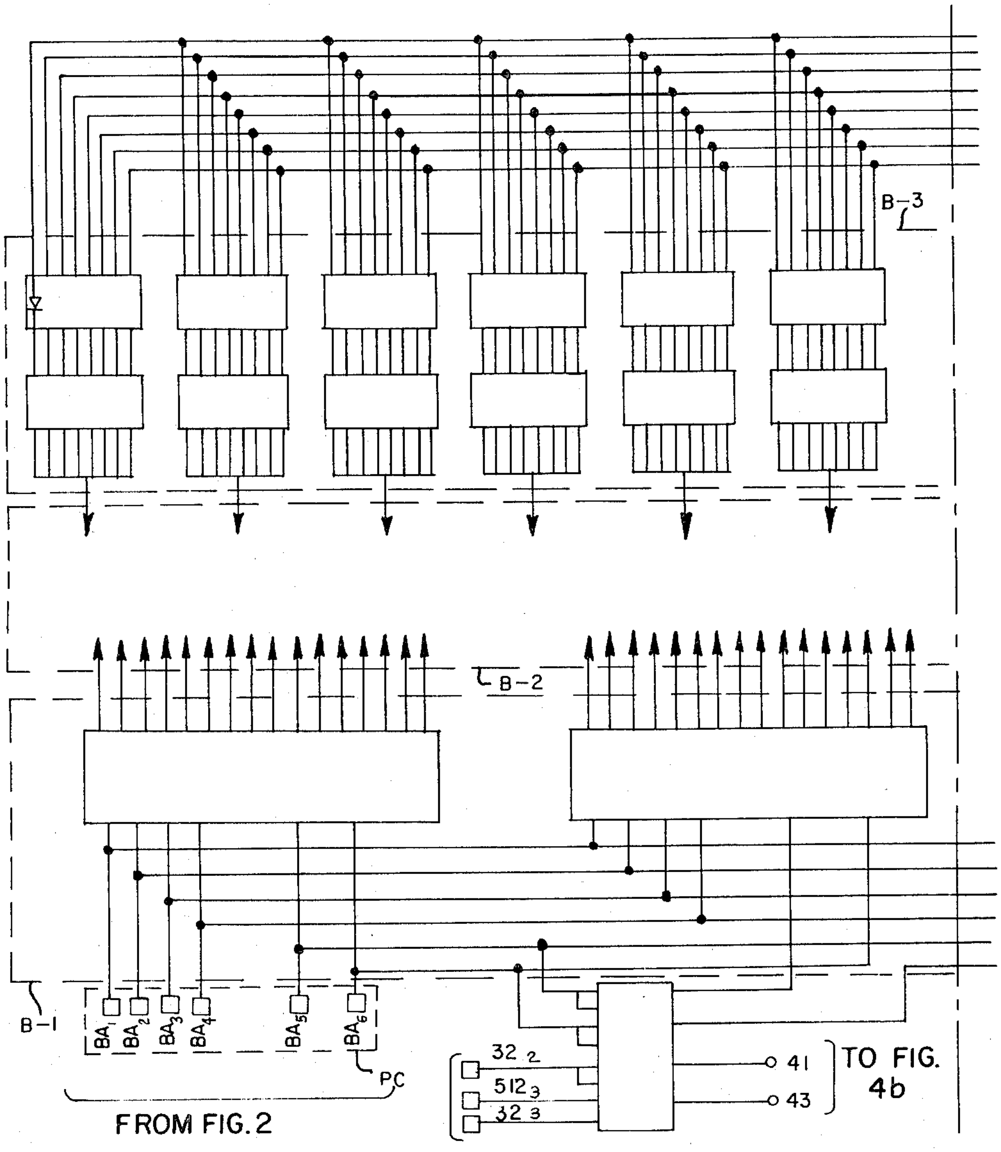
FIGS. 6*a* and 6*b* are an electrical schematic of the product pricing board utilized to compare the price of the product selected to the amount of money in the machine.
Figure 6B:
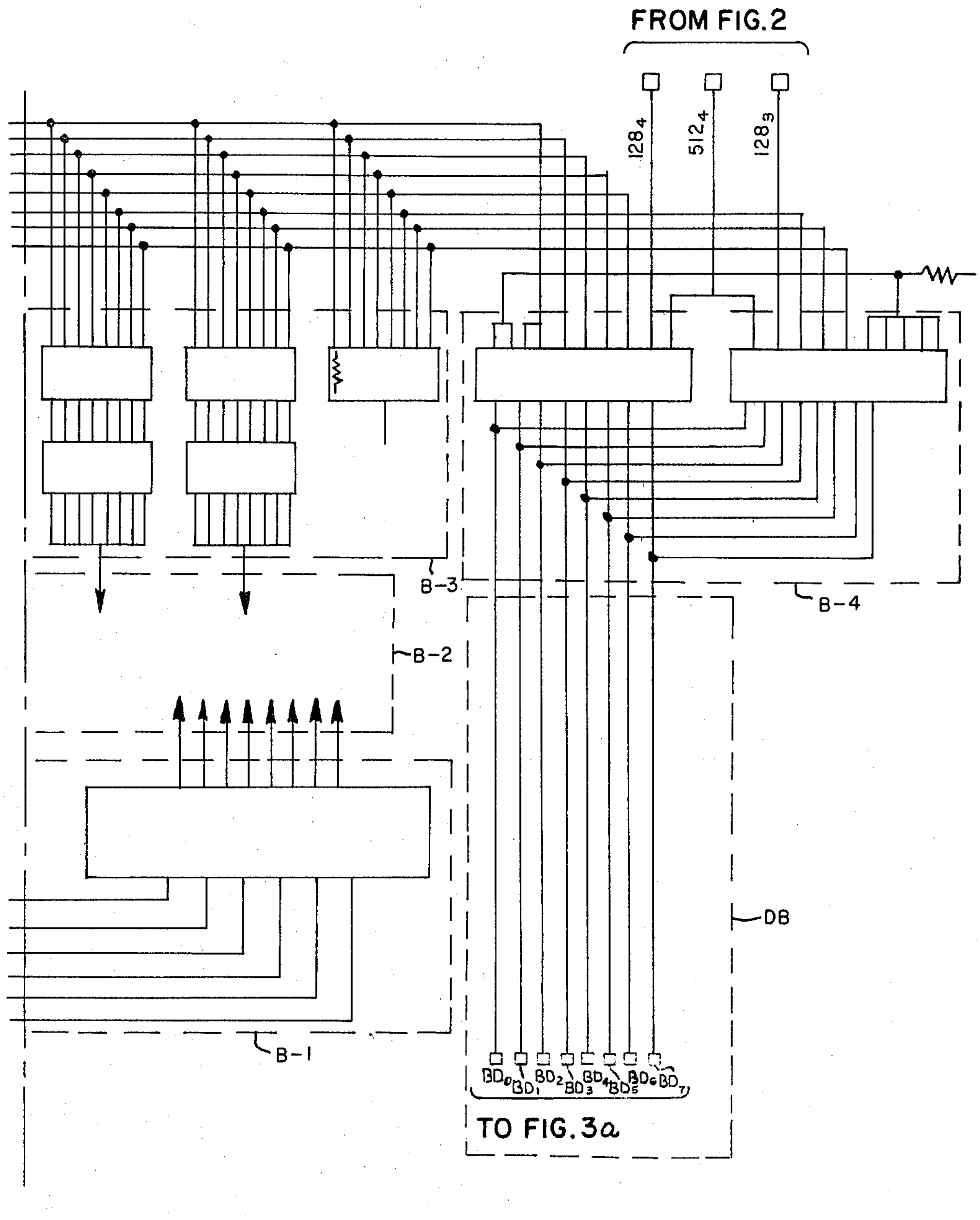

The signal corresponding to the product selected is coupled from the program counter PC to a one-of-42 decoder B-1 (shown in FIGS. 6*a* and 6*b*). The signal corresponding to the number of the product selected is then decoded by decoder B-1, providing an output signal into a jack field B-2 by energizing an output terminal of decoder B-1 which corresponds to the particular product selected.

A plurality of product or commodity price select switches B-3 (shown in FIGS. 6*a* and 6*b*) correspond to each of the 42 possible products that may be selected through the keyboard D. Each of the product price select switches may be manually set to correspond to any price from $0.05 through $7.95 in $0.05 increments. While eight such switches are illustrated, any number of switches may be used if additional pricing is desired. Therefore, any output signal present in decoder B-1 will effect an output signal on one of the commodity price select switches B-3 which will correspond to the price for the particular product selected through the interconnection of the output terminals of decoder B-1 with the commodity price select switches B-3 by means of the interconnecting jack field B-2.

From the data appearing on the commodity price select switches B-3, the programmed price reading buffer B-4 couples the dollar and cents information for the product selected into the microprocessor A-1. This information is coupled into the microprocessor A-1 for comparison with the signals stored in the RAM A-6, which corresponds to the value of the coins accumulated in the coin mechanism peripheral.

The programmed price reading buffer B-4 couples the data into the microprocessor A-1 through data buss DB by the AND coupling of the fourth group of 512 data bytes with the third group of 128 data bytes, thereby reading into the microprocessor A-1 the dollar value corresponding to the product which has been selected on the keyboard D. The cents portion of the product selected is AND coupled into the programmed price reading buffer B-4 through the AND coupling of the fourth group of 512 data bytes with the fourth group of 128 data bytes, thereby coupling the cents portion through the data buss DB to the microprocessor A-1.

If the amount of coins deposited through the coin mechanism peripheral does not correspond with the price of the product selected, as read into the microprocessor A-1 from the product price select switches B-3 through the programmed price reading buffer B-4, depression and release of the key switch will be ignored. The microprocessor A-1 will, in accordance with the program of the PROM A-5, continue interrogating the coin input peripheral mechanism and the keyboard peripheral D, until the coin return switch is energized or another key of the keyboard D has been depressed and released which indicates a product corresponding to the total amount of money deposited in the coin peripheral mechanism.

When the product price coincides with the accumulated money deposited, the microprocessor A-1 will initiate a vend cycle. Upon initiation of the vend cycle, the program in the PROM A-5 instructs the microprocessor A-1 to select one of the codes stored in another part of the PROM, which corresponds to the product selected through the keyboard peripheral equipment D. The microprocessor A-1 is then instructed to load the product code from the PROM A-5 into a row and column register C-1 and C-2, respectively, the output of which are connected to one row and one column relay through buffer amplifiers C-1A and C-2A. The reed contacts of the selected row and column relays are then dry energized or closed. Subsequently a control relay C-8 is energized through a control register C-4 to supply power through the closed contacts. By dry energizing or dry de-energizing (closing or opening under a no-power load condition) arcing between the reed contacts of the various relays is prevented thereby extending the life of the contacts. Load current through the relay system is switched exclusively by the opening and closing of the control relay C-8.

The setting up of the control register C-4 is effected through an AND coupling of the fifth group of 512 data bytes and the third group of 32 data bytes by AND gates C-13. Upon energization of the control relay C-8, the proper product solenoid (corresponding to the product to be dispensed) will be energized dispensing the selected product to a receiving tray. The microprocessor A-1 will then interrogate a dispense verification signal peripheral buffer A-8A to determine the presence of a signal to verify that the selected product has been dispensed. The dispense verification signal is generated through an electromechanical transducer supported from the dispense tray of the vending machine, and in the preferred embodiment comprises a commercially available speaker. A product dropping onto the dispense tray energizes the coil of the speaker providing an output signal to indicate that a product has been dispensed thereby eliminating the necessity of 42 individual detectors to determine a supply of each product in each of the vending machine product storage bins. Generating the dispense verification signal in this manner not only eliminates the need for a multiplicity of individual detectors, but also insures that the customer's money is returned if for any reason a product is not dispensed from the machine.

If a dispense verification signal is present on the buffer A-8A, the microprocessor A-1 will then be instructed by the PROM A-5 program to de-energize the control relay C-8 through the control register C-4. At the same time when the dispense verification signal is received, the microprocessor A-1 is instructed to energize a coin accept relay R-14 through the register C-3 and the buffered amplifier C-3A. The contacts of the coin accept relay R-14 are dry energized or closed and the control register C-4 is actuated to close the contacts of the control relay C-8 providing power to the accept solenoid (not shown) which is coupled to output terminal 53. The coins deposited in the coin mechanism peripheral are then collected in a cash box.

If a dispense verification system is not received within a predetermined time period, the microprocessor A-1 will thereafter dry energize the coin return relay R-15 closing the contacts thereof. The microprocessor will then energize control register C-4 to close the contacts of control relay C-8 thereby returning the coins to the customer by actuating a coin return solenoid (not shown) which is coupled to output terminal 51.

In either case where a proper vend, or a return of the coins to the customer has been effected, the control relay C-8 will then be de-energized through the control register C-4 de-energizing the solenoid which had been actuated. Therefore, the row and column relays will be dropped out under no current loading and the microprocessor A-1 will commence a new cycle of operation.

The system heretofore described also includes a power interruption feature so that upon interruption of the power supply to the microprocessor A-1 during a cycle of operation, the coin accept solenoid R-14 will be energized upon reestablishment of the power. Therefore, if power is interrupted after a product has been dispensed, but before the coin accept solenoid has been energized to pass the coins into the cash box, the microprocessor A-1 will accept the coins held in the system before being reset to an intial position to start a new cycle of operation.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

TABLE 1

PROM PROGRAM

| | | | | | |
|---|---|---|---|---|---|
| 000 | 08 | | 01F | 37 | |
| 001 | 08 | | 020 | 06 | |
| 002 | 08 | | 021,22 | D4 | 01 |
| 003,04 | C4 | 08 | 023,24 | 9C | 17 |
| 005 | 37 | | 025,26 | C9 | 00 |
| 006,07 | C4 | 01 | 027,28 | C9 | 01 |
| 008 | 35 | | 029,2A | CA | 20 |
| 009,0A | C4 | 61 | 02B,2C | CA | 40 |
| 00B | 31 | | 02B,2E | CB | 00 |
| 00C | 3D | | 02F,30 | C2 | 00 |
| 00D,0E | C4 | 02 | 031,32 | D4 | 40 |
| 00F | 35 | | 033,34 | 9C | 07 |
| 010,11 | C4 | 00 | 035,36 | C4 | 80 |
| 012 | 31 | | 037,38 | CB | 00 |
| 013,14 | C4 | 04 | 039,3A | C4 | 02 |
| 015 | 36 | | 03B | 07 | |
| 016,17 | C4 | 00 | | | |
| 018 | 32 | | | | |
| 019,1A | C4 | 00 | | | |
| 01B | 33 | | | | |
| 01C | 08 | | | | |
| 01D,1E | C4 | 08 | | | |

COIN SCAN

| | | | | | |
|---|---|---|---|---|---|
| | | | 060,61 | 90 | 06 |
| 03C,3D | C2 | 00 | 062,63 | C4 | 10 |
| 03E,3F | D4 | 0F | 064,65 | 90 | 02 |
| 040,41 | 98 | 36 | 066,67 | C4 | 25 |
| 042 | 01 | | 068,69 | E9 | 01 |
| 043,44 | 8F | 10 | 06A,6B | C9 | 01 |
| 045,46 | C2 | 00 | 06C,6D | C4 | 00 |
| 047,48 | D4 | 0F | 06E,6F | E9 | 00 |
| 049,4A | 9C | FA | 070,71 | C9 | 00 |
| 04B,4C | 8F | 10 | 072 | 06 | |
| 04D | 40 | | 073,74 | DC | 01 |
| 04E | 02 | | 075 | 07 | |
| 04F | 1C | | 076,77 | 90 | 05 |
| 050,51 | 98 | 0C | 078 | 06 | |
| 052 | 1C | | 079,7A | D4 | 01 |
| 053,54 | 98 | 0D | 07B,7C | 98 | 90 |
| 055 | 1C | | | | |
| 056,57 | 98 | 0E | | | |
| 058,59 | E9 | 00 | | | |
| 05A,5B | C9 | 00 | | | |
| 05C,5D | 90 | 14 | | | |
| 05E,5F | C4 | 05 | | | |

READOUT SEQUENCE

| | | |
|---|---|---|
| 07D,7E | C1 | 00 |
| 07F,80 | CA | 20 |
| 081,82 | C1 | 01 |
| 083,84 | CA | 40 |
| 085,86 | C2 | 00 |
| 087,88 | D4 | 10 |
| 089,8A | 9C | 07 |
| 08B,8C | C4 | 01 |
| 08D | 36 | |
| 08E,8F | C4 | 6D |
| 090 | 32 | |
| 091 | 3E | |

KEYBOARD SCAN

| | | | | | |
|---|---|---|---|---|---|
| 092,93 | C4 | 06 | 0BC,BD | C6 | 06 |
| 094 | 37 | | 0BE,BF | C3 | 10 |

-continued

| KEYBOARD SCAN | | | | | |
|---|---|---|---|---|---|
| 095,96 | C4 | 00 | 0C0,C1 | 90 | 06 |
| 097 | 33 | | 0C2,C3 | C6 | 10 |
| 098,99 | C3 | 3F | 0C4,C5 | C3 | 20 |
| 09A,9B | 98 | 81 | 0C6,C7 | 98 | D0 |
| 09C,9D | C4 | 00 | 0C8,C9 | 9C | 08 |
| 09E,9F | C9 | 02 | 0CA,CB | C4 | 0E |
| 0A0,A1 | C4 | 00 | 0CC,CD | F1 | 02 |
| 0AZ | 36 | | 0CE,CF | C9 | 02 |
| 0A3,A4 | C4 | A9 | 0D0,D1 | 92 | 00 |
| 0A5 | 32 | | 0D2 | 1C | |
| 0A6,A7 | C3 | 01 | 0D3,D4 | 98 | 0A |
| 0A8,A9 | 90 | 1E | 0D5 | 01 | |
| 0AA,AB | C6 | 06 | 0D6,D7 | C4 | 02 |
| 0AC,AB | C3 | 02 | 0D8,D9 | F1 | 02 |
| 0AE,AF | 90 | 18 | 0DA,DB | C9 | 02 |
| 0B0,B1 | C6 | 06 | 0DC | 40 | |
| 0B2,B3 | C3 | 04 | 0DD,DE | 90 | F3 |
| 0B4,B5 | 90 | 12 | 0DF,E0 | C1 | 02 |
| 0B6,B7 | C6 | 06 | 0E1 | 01 | |
| 0B8,B0 | C3 | 08 | 0E2,E3 | C3 | 3F |
| 0BA,BB | 90 | 0C | 0E4,E5 | 9C | FC |
| | | | 0E6,E7 | 8F | 50 |

| DETERMINE VALIDITY OF SELECT | | |
|---|---|---|
| Oe8,E9 | C4 | 07 |
| 0Ea | 37 | |
| 0eB,EC | C4 | 80 |
| 0ED | 33 | |
| 0EE,EF | C3 | 80 |
| 0F0,F1 | E1 | 01 |
| 0F2,F3 | 9C | 09 |
| 0F4,F5 | C4 | 00 |
| 0F6 | 33 | |
| 0F7,F8 | C3 | 80 |
| 0F9,FA | E1 | 00 |
| 0FB,FC | 98 | 0C |
| 0FD,FE | C4 | 04 |
| 0FF | 36 | |
| 100,01 | C4 | 0C |
| 102 | 33 | |
| 013,104 | C4 | 00 |
| 105 | 37 | |
| 106,107 | C4 | 00 |
| 108 | 3F | |

| STAMP SELECT SEQUENCE | | |
|---|---|---|
| 109,0A | C4 | 08 |
| 10B | 37 | |
| 10C,0D | C4 | 1E |
| 10E | 60 | |
| 10F,10 | 98 | 05 |
| 111,12 | C4 | 2C |
| 113 | 60 | |
| 114,15 | 9C | 09 |
| 116, | 06 | |
| 117,18 | DC | 04 |
| 119 | 07 | |
| 11A | 06 | |
| 11B,1C | D4 | 02 |
| 11D,1E | 9C | 4F |

| DISPENSE SEQUENCE | | | | | |
|---|---|---|---|---|---|
| 11F,20 | C4 | 01 | 149,4A | 9C | 0D |
| 121 | 36 | | 14B | 03 | |
| 122,23 | C4 | A0 | 14C,4D | C4 | 0A |
| 124 | 70 | | 14E | 78 | |
| 125 | 32 | | 14F,50 | 98 | 15 |
| 126,27 | C2 | 00 | 151 | 02 | |
| 128,29 | C3 | 00 | 152,53 | C4 | 01 |
| 12A,2B | C4 | A1 | 154 | 70 | |

-continued

| DISPENSE SEQUENCE | | | | | |
|---|---|---|---|---|---|
| 12C | 70 | | 155 | 01 | |
| 12D | 32 | | 156,57 | 90 | EB |
| 12E,2F | C2 | 00 | 158,59 | 8F | 50 |
| 130,31 | CB | 20 | 15A,5B | CB | 60 |
| 132,33 | 8F | 15 | 15C,5D | 8F | 15 |
| 134,35 | CB | 40 | 15E,5F | C4 | 00 |
| 136 | 06 | | 160,61 | CB | 00 |
| 137,38 | D4 | 04 | 162,63 | C4 | 40 |
| 139,3A | 9C | 1D | 164,65 | 90 | 0A |
| 13B,3C | C4 | 04 | 166,67 | CB | 60 |
| 13D | 36 | | 168,69 | 8F | 15 |
| 13E,3F | C4 | 00 | 16A,6B | C4 | 00 |
| 140 | 01 | | 16C,6D | CB | 00 |
| 141 | 40 | | 16E,6F | C4 | 80 |
| 142 | 32 | | 170,71 | CB | 20 |
| 143,44 | 8F | 18 | 172,73 | 8F | 15 |
| 145,46 | C2 | 00 | 174,75 | CB | 40 |
| 147,48 | D4 | 20 | 176,77 | 8F | 50 |
| | | | 178,79 | CB | 60 |
| | | | 17A,7B | 8F | 50 |
| 17C,7D | C4 | 00 | 194 | 08 | |
| 17E | 07 | | 195 | 08 | |
| 17F,180 | C4 | 00 | 196 | 08 | |
| 181 | 37 | | 197 | 08 | |
| 182,83 | C4 | 0C | 198 | 08 | |
| 184 | 33 | | 199 | 08 | |
| 185 | 3F | | 19A | 08 | |
| 186 | 08 | | 19B | 08 | |
| 187 | 08 | | 19C | 08 | |
| 188 | 08 | | 19D | 08 | |
| 189 | 08 | | 19E | 08 | |
| 18A | 08 | | 19F | 08 | |
| 18B | 08 | | | | |
| 18C | 08 | | | | |
| 18D | 08 | | | | |
| 18E | 08 | | | | |
| 18F | 08 | | | | |
| 190 | 08 | | | | |
| 191 | 08 | | | | |
| 192 | 08 | | | | |
| 193 | 08 | | | | |

| RELAY CODES | | | | | |
|---|---|---|---|---|---|
| 1A0,A1 | 01 | 01 | 1D6,D7 | 40 | 08 |
| 1A2,A3 | 02 | 01 | 1D8,D9 | 01 | 10 |
| 1A4,A5 | 04 | 01 | 1DA,DB | 02 | 10 |
| 1A6,A7 | 08 | 01 | 1DC,DD | 04 | 10 |
| 1A8,89 | 10 | 01 | 1DE,DF | 08 | 10 |
| 1AA,AB | 20 | 01 | 1E0,E1 | 10 | 10 |
| 1AC,AD | 40 | 01 | 1E2,E3 | 20 | 10 |
| 1AE,AF | 01 | 02 | 1E4,E5 | 40 | 10 |
| 1B0,B1 | 02 | 02 | 1E6,E7 | 01 | 20 |
| 1B2,B3 | 04 | 02 | 1E8,E9 | 02 | 20 |
| 1B4,B5 | 08 | 02 | 1EA,EB | 04 | 20 |
| 1B6,B7 | 10 | 02 | 1EC,ED | 08 | 20 |
| 1B8,B9 | 20 | 02 | 1EE,EF | 10 | 20 |
| 1BA,BB | 40 | 02 | 1F0,F1 | 20 | 20 |
| 1BC,BD | 01 | 04 | 1F2,F3 | 40 | 20 |
| 1BE,BF | 02 | 04 | 1F4 | 08 | |
| 1C0,C1 | 04 | 04 | 1F5 | 08 | |
| 1C2,C3 | 08 | 04 | 1F6 | 08 | |
| 1C4,C5 | 10 | 04 | 1F7 | 08 | |
| 1C6,C7 | 20 | 04 | 1F8 | 08 | |
| 1C8,C9 | 40 | 04 | 1F9 | 08 | |
| 1CA,CB | 01 | 08 | 1FA | 08 | |
| 1CC,CD | 02 | 08 | 1FB | 08 | |
| 1CE,CF | 04 | 08 | 1FC | 08 | |
| 1D0,D1 | 08 | 08 | 1FD | 08 | |
| 1D2,D3 | 10 | 08 | 1FE | 08 | |
| 1D4,D5 | 20 | 08 | 1FF | 08 | |

What is claimed is:

1. A system for controlling the operation sequencing of a machine comprising, actuating signal generating means for generating actuating signals coupled to dispensing actuators for effecting operation of a machine including said actuators operable upon the receipt of an actuating signal to effect the operation thereof, programmable command signal generating means coupled to said actuating signal generating means for coupling command signals thereto for effecting generation of said actuating signals therefrom, condition responsive means coupled to said actuating signal generating means for generating a condition responsive signal thereto, said actuating signal generating means actuable upon receipt of said condition responsive signal and a command signal generated by said programmable command signal generating means to produce said actuating signals responsive to the condition responsive signal for effecting operation of the actuators of said machine, wherein said actuating signal generating means produces an enabling signal coupled to said programmable command signal generating means to effect generation of a command signal therefrom for effecting the generation of said actuating signals, and wherein said condition responsive means comprises a verification signal generating means coupled to said actuating signal generating means and generating a condition responsive verification signal to verify dispensing operation of a machine actuator which has been operated upon receipt of an actuating signal from said actuating signal generating means, and said actuating signal generating means actuable upon receipt of said verification signal to produce an enabling signal coupled to said programmable command signal generating means to effect generation of a command signal resetting said actuating signal generating means to an initial condition.

2. The system of claim 1 wherein said actuating signals generated by said actuating signal generating means and coupled to said actuators represent a value corresponding to the condition determined by said condition responsive means.

3. The system of claim 2 further including memory storage means coupled to said actuating signal generating means for storing a signal from said actuating signal generating means which corresponds to the condition determined by said condition responsive signal generating means.

4. The system of claim 3 further including display means coupled tp said actuating signal generating means and actuable thereby for displaying a condition corresponding to the signal stored in said memory storage means.

5. The system of claim 4 wherein said memory storage means generates said enabling signal coupled to said actuating signal generating means for generating said enabling signal coupled from said actuating signal generating means to said programmable command signal generating means to effect generation of a command signal therefrom to effect actuation of said display means by said actuating signal generating means.

* * * * *